United States Patent [19]

Kissler

[11] Patent Number: 5,437,799
[45] Date of Patent: Aug. 1, 1995

[54] METHOD AND INTERFACE VALVE FOR SEPARATING A FLUID

[76] Inventor: Gerhard Kissler, Posener Strasse 90, 93057 Regensburg, Germany

[21] Appl. No.: 107,666
[22] PCT Filed: Jan. 20, 1992
[86] PCT No.: PCT/EP92/00108
    § 371 Date: Nov. 29, 1993
    § 102(e) Date: Nov. 29, 1993
[87] PCT Pub. No.: WO92/14953
    PCT Pub. Date: Sep. 3, 1992

[30] Foreign Application Priority Data
    Feb. 15, 1991 [DE] Germany .................. 41 04 741.9

[51] Int. Cl.[6] ............................................. B01D 17/00
[52] U.S. Cl. ........................................ 210/767; 95/241;
        95/291; 210/188; 210/511; 210/790
[58] Field of Search ............... 210/511, 634, 637, 639,
        210/767, 808, 188, 790; 95/31, 291, 241

[56] References Cited
U.S. PATENT DOCUMENTS
4,949,742  8/1990  Rando et al. .................. 137/13
4,997,569  3/1991  Sirkar ........................ 210/639

FOREIGN PATENT DOCUMENTS
1031082  8/1990  France .

OTHER PUBLICATIONS
"Liquid Extraction", Publication by Robert E. Treyball, Second Edition, pp. 437-440 and 452-457, Published Feb. 4, 1963.

Primary Examiner—Joseph W. Drodge
Attorney, Agent, or Firm—Tilton Fallon Lungmus

[57] ABSTRACT

The invention concerns a method and an interface valve for the purpose of the separation of fluids where the separation process proceeds under control and quasi static and quickly on an extended surface and affords minimal expenditure of energy. By inserting the separating fluid 1c in layers into the fluid 1a, 1b that is to be separated, a separating layer T develops the surface tension of which is causing the separation of the fluids 1a, 1b.

6 Claims, 14 Drawing Sheets

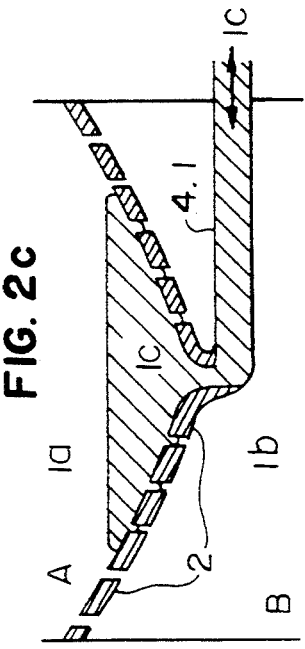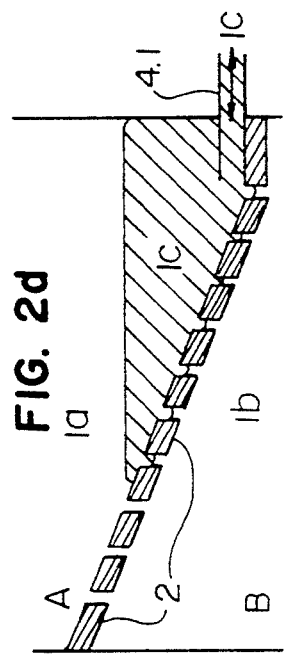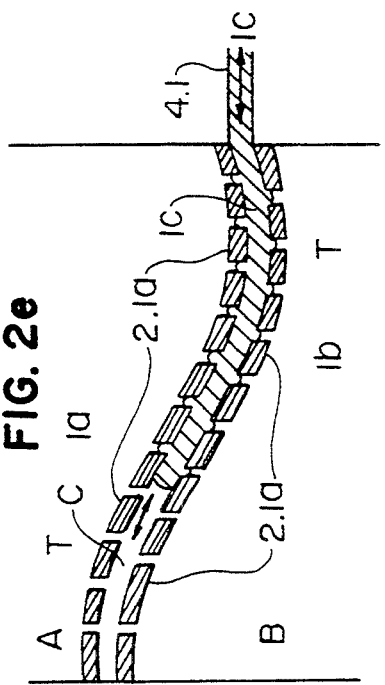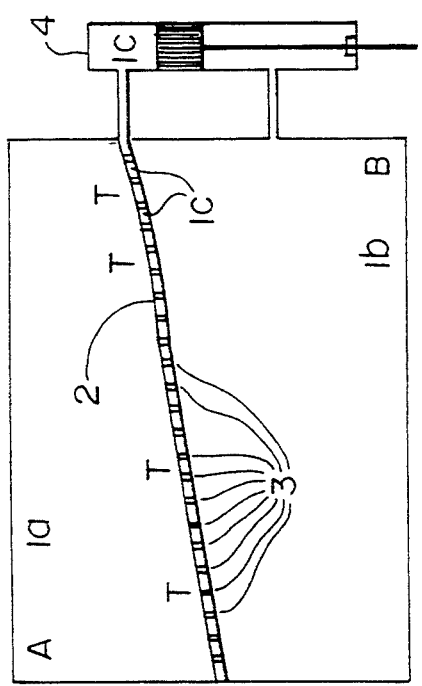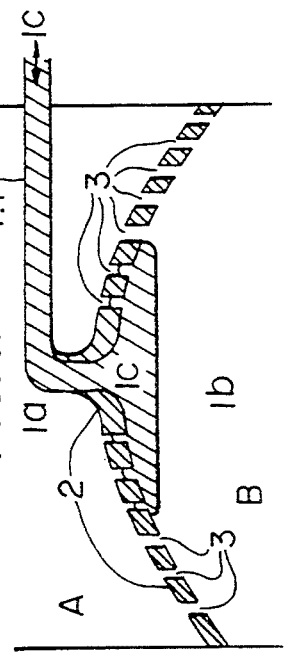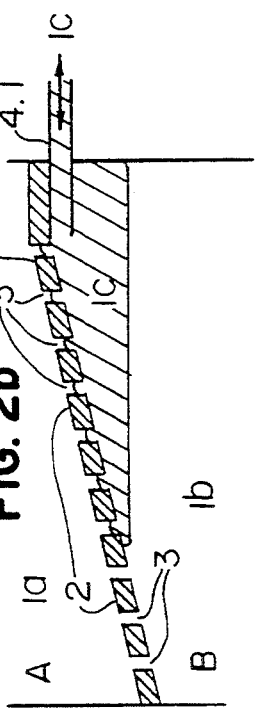

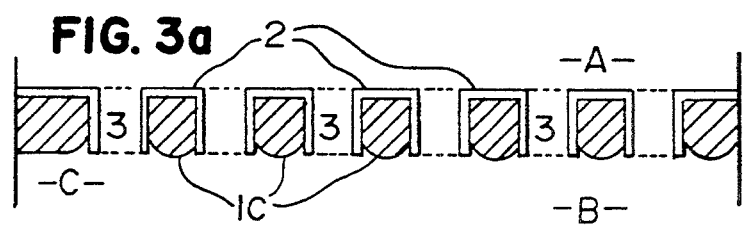
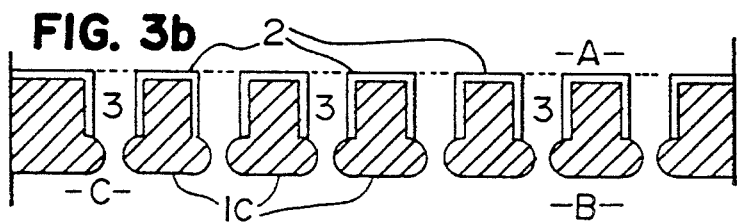
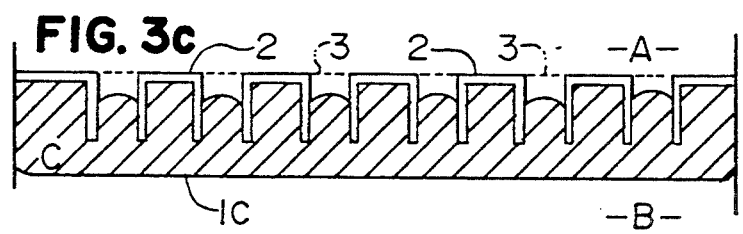

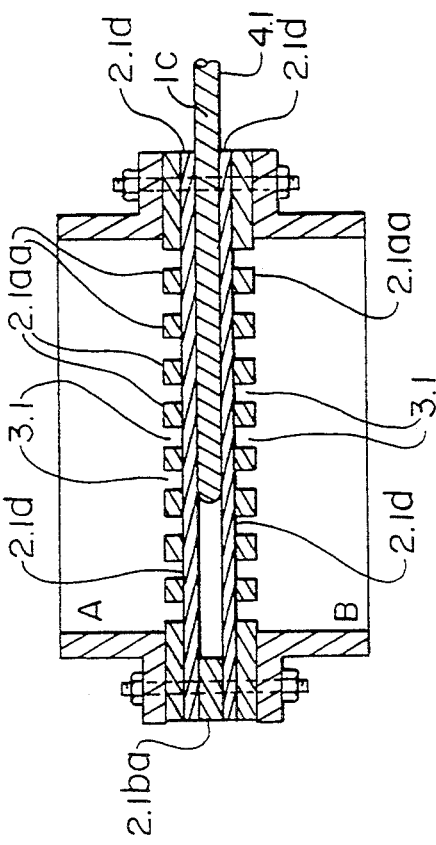
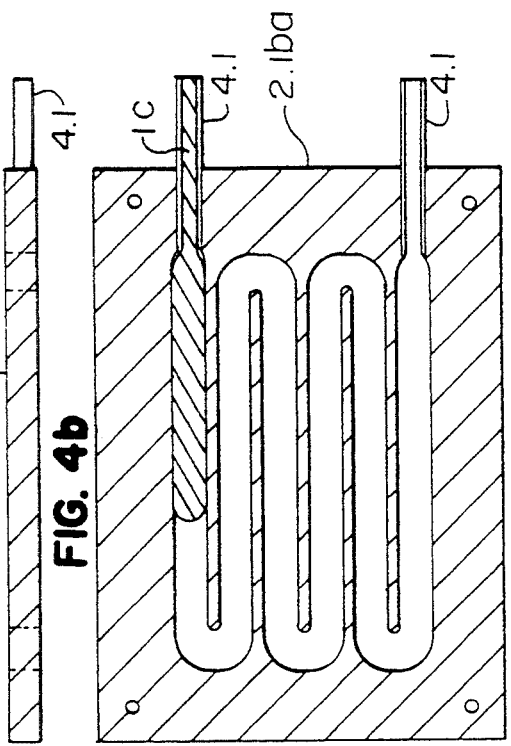
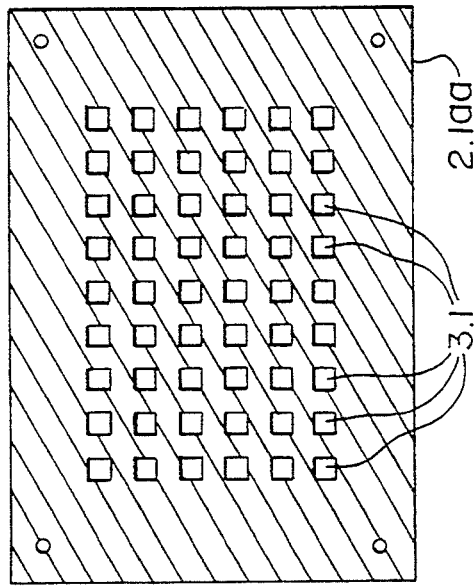
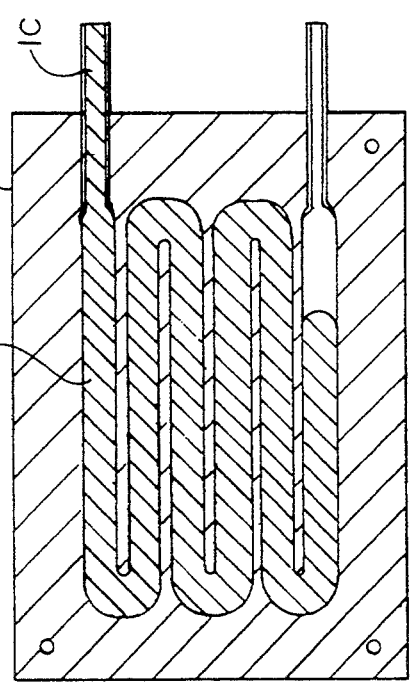

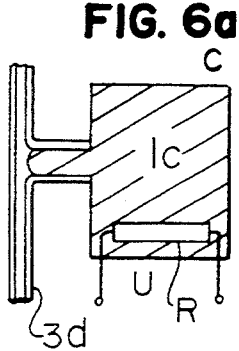
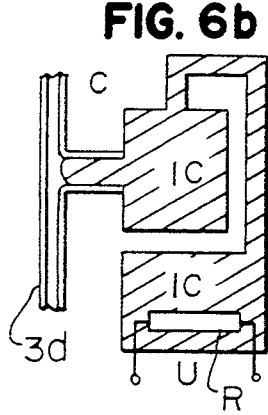
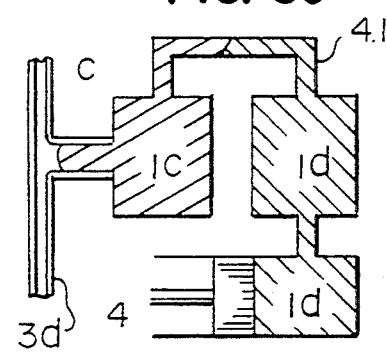
FIG. 6a  FIG. 6b  FIG. 6c
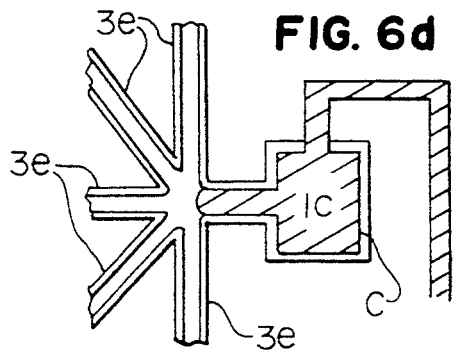
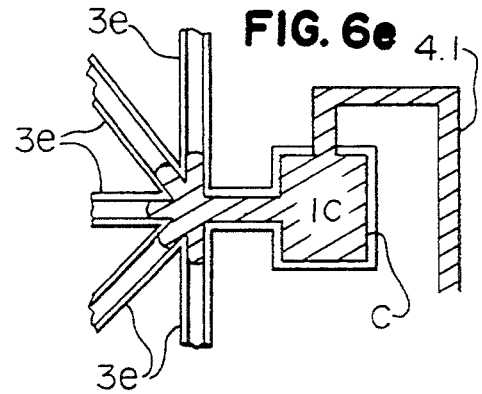
FIG. 6d  FIG. 6e
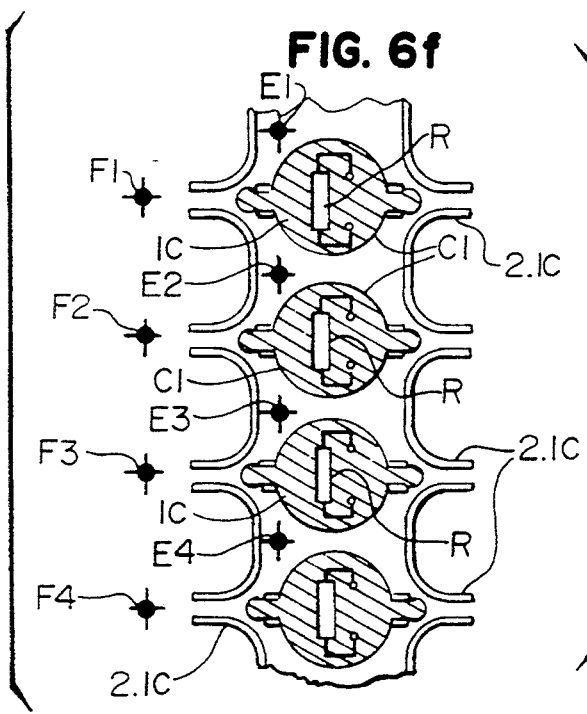
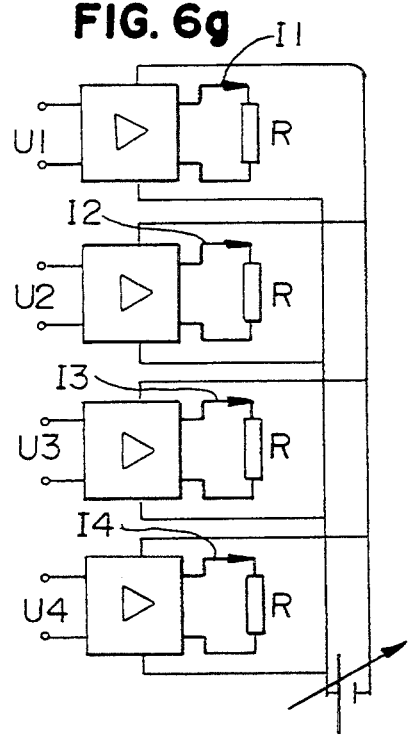
FIG. 6f  FIG. 6g

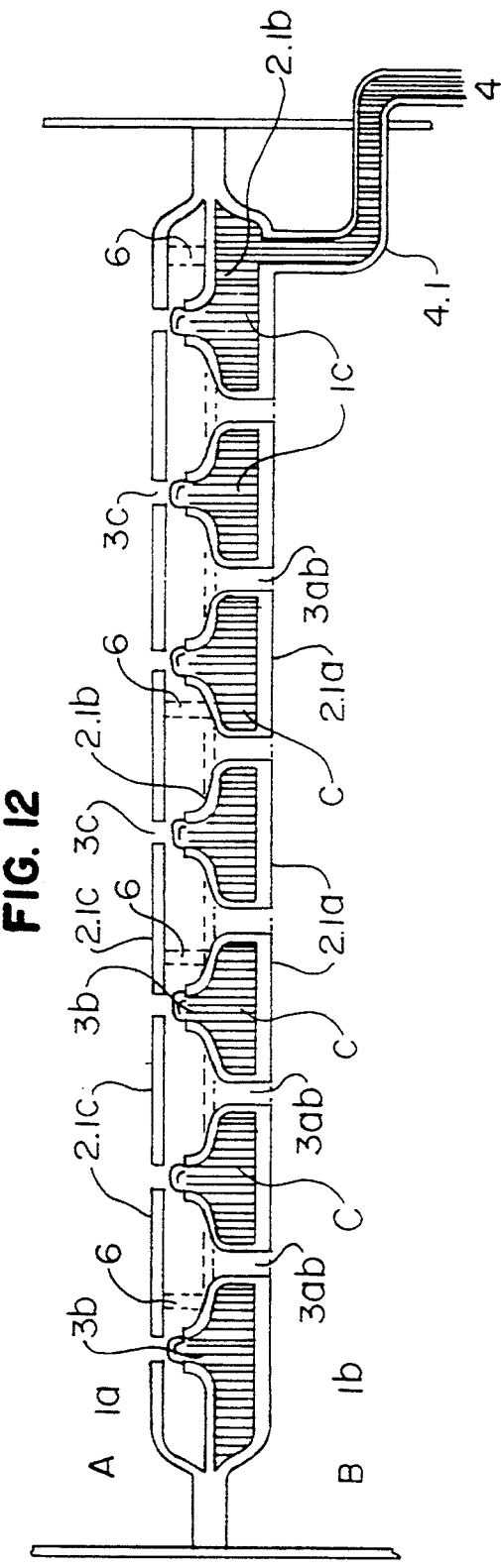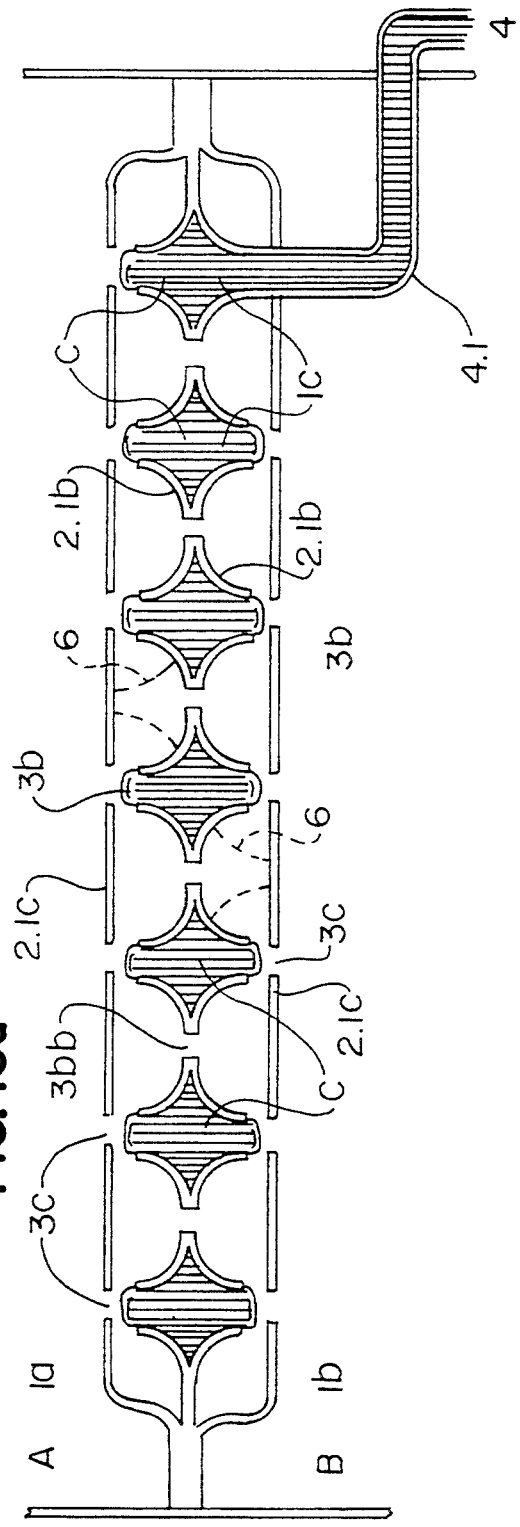

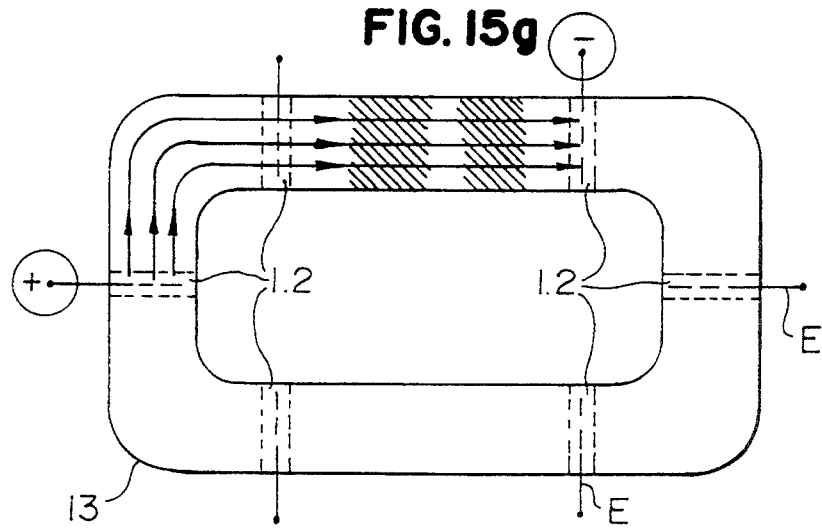
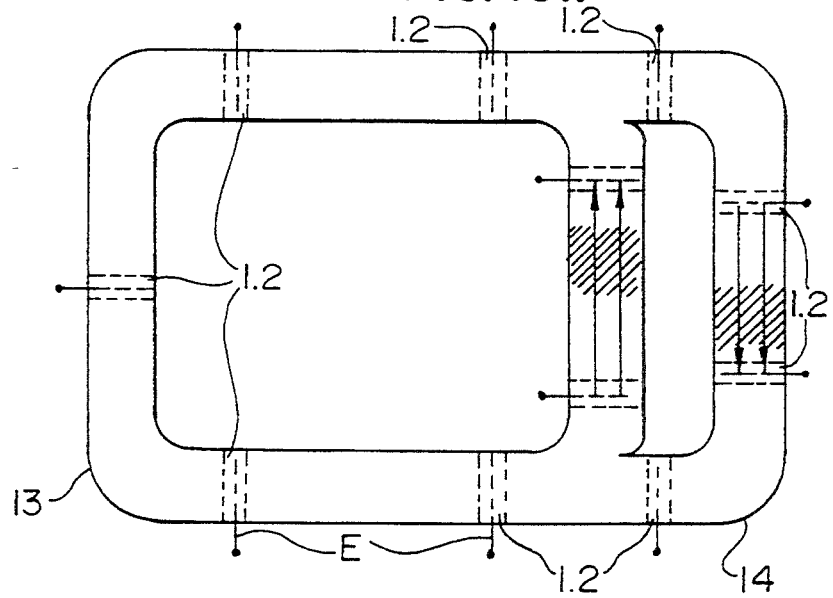

METHOD AND INTERFACE VALVE FOR SEPARATING A FLUID

The invention refers to a method and to an interface valve for the separation of fluids.

Hitherto fluids were separated by mechanical means, for example by stop cocks or by slide valves. As a fluid gaseous as well as liquid mediums are designated equally. Within the patent specification FR-A 10 31 082 a valve for regulating the flux of a fluid by the aid of spongy porous material is depicted. The valve is open when the spongy material is dry. In case the spongy material absorbs a control liquid the valve is closing. The spongy material may be depleted again by mechanical, physical or chemical means and may thus be led back to the opened state.

The purpose of this invention is to create a method and an interface valve for the separation of fluids where the local separation of the fluid occurs controllably along a separation plane that is defined freely within wide limits and requires only minimal expenditure of energy.

Within a space, filled out by a fluid, an arbitrary separation plane may be chosen separating the space in two parts of space and along to them a separating layer is built up by the separating fluid.

The separating fluid may be brought in directed along this separating layer layer-like and may be maintained for a pre-determined time under such a high interface tension that the fluid filling both parts of space on either side of the separation plane is separated.

A separation of that kind is performed contollably since it suffices to maintain the interface tension between the separating fluid and the fluid for a predetermined time in such a way that the fluid does not mix.

This method allows also to maintain the separating layer only at a fractional part of the separation plane of the space or to conduct the separating fluid along the separating layer especially by pumping and exhausting.

The separation of the fluid according to the inventional method affords only minimal expenditure of energy since the inserting of the separating fluid into the fluid is an elastic-like process.

This method allows separation of a fluid consisting of one substance only as well as a fluid comprising two different fluids, whereby in the latter case the two different fluids may be separated.

The precondition for this is only that the separating fluid does not mix at least with one of the fluids which are to be separated. The pressure rates necessary for the interface tension are chosen according to the material components of the separating fluid and the separated fluid and to the geometric conditions of space.

Preferred types of design of the invention are shown in the drawings.

The operating mechanism of the invention deals closely with the theory of surface tensional forces and with the minimal surfaces of liquids.

The interface valve is to be classified between membranes and mechanical valves according to its function.

The procedure and the interface valve according to the invention offer new prospects to several domains of chemical engineering and electrochemistry.

Some possible fields of application are specified in the following:

1. general chemical engineering, separation and mingling of reactive material, construction of chemical reactors;
2. general electrochemistry, separation of ionic mixtures on a large, industrial scale, electrodeposition of metallic layer structures, generation of heterostructures and multilayer structures, manufacturing of new materials having anisotropical material properties, manufacturing of large energy conversion elements by electrodeposition;
3. dressing of minerals through wet processing by ion separation, getting of rare metals, exploitation of hitherto not mineable mineral desposits, gaining of rare metals from sea-water or from waste water;
4. environmental technics, regaining of heavy metals like cadmium, lead, mercurium by ion separation, recycling of plating bathes and of chemical waste water;
5. manufacturing of micromechanical, reactional and analytical apparatus within the domain of silicon etching;
6. medical technics, apparatus for blood's detoxication and refining.

Further essential advantages of the method and interface valve according to the invention together with examples of design types are mentioned in the following:

1. According to the invention the interface valves are to be manufactured easily and economically by well-known materials being under technical control, especially by polymetric material, for example by the so-called deep-drawing technique.
2. There is the possibility of opening or closing large separating planes within a range of some square meters and more, abruptly under control and with minimal operating time of one second and with a minimal expenditure of energy.
3. The proper valve's body, i.e. the support of the separating fluid remains throughout long periods without wear.
4. the stability against fluctuations of pressure from outside is great.

In the following the invention is described more specifically by the aid of the drawings which show in FIG. 1 a cross-section of the interface valve according to the invention, in FIG. 2a to 2e further types of design of an interface valve according to the invention by cross-sectional view, in FIG. 3a to 3c a type of design of a support belonging to a further example of the interface valve's type of design according to the invention by cross-sectional view, in FIG. 4a and 4b a view from above of the support's plate of a further interface valve according to the invention, in FIG. 4c a cross-section through the plate from FIG. 4a and 4b, in FIG. 4d a top view of a further support's plate of the interface valve's type of design according to the invention from FIG. 4a to 4c, in FIG. 4e a cross-section of the type of design of the interface valve from FIG. 4a to 4d.

in FIG. 5a and 5b some further types of design of the interface valve according to the invention by cross-sectional view, in FIG. 5c and 5d two further types of design of the interface valve according to the invention by view from below, in FIG. 5e and 5f the types of design of the interface valve from FIG. 5c, 5d, in FIG. 6a to 6e further types of design of the interface valve according to the invention by cross-sectional view, in FIG. 6f a further type of design of an interface valve according to the invention by cross-sectional view, in FIG. 6g a control unit for the interface valve according to the invention from FIG. 6f, in FIG. 7a a further type of design of the interface valve's support according to the invention by cross-sectional view, In FIG. 7b and 7c further types of design of the interface valve according to the invention by cross-sectional view, in FIG. 7d a further type of design according to FIG. 7b, 7c by perspective view, in FIG. 8a a hole channel according to the invention of the interface valve's type of design from FIG. 7b, 7c, 7d by top view, in FIG. 8b one hole channel according to the invention of the type of design from FIG. 7a by top view, in FIG. 8c, 8d, 8e types of design according to the invention proposed for the hole channel's cross-sectional plane by top view, in FIG. 8f a further type of design of the hole channel by cross-sectional view, in FIG. 9a and 9b a further type of design of the hole channel according to the invention by cross-sectional view, in FIG. 10a, 10b, 10c types of design proposed for a pressure prop within the hole channels by cross-sectional view, in FIG. 11a, 11b, 11c a further type of design of the pressure prop within the hole channel by cross-sectional view, in FIG. 12e a further type of design of the interface valve according to the invention by cross-sectional view, in FIG. 13a one further type of design of the interface valve according to the invention by cross-sectional view, in FIG. 13b, 13c, 13d further types of design of the interface valve according to the invention by perspective view, in FIG. 14 a multi-electrode-system applying the interface valve according to the invention by cross-sectional view, in FIG. 15a to 15d a schematical representation of an ion separation plant applying the interface valve according to the invention, in FIG. 15e to 15g a further type of design of the ion separation plant applying the interface valve according to the invention by top view, in FIG. 15h a further type of design of the ion separation plant applying the interface valve by top view, in FIG. 16 a schematical representation of a further type of design of an interface valve system using the interface valve according to the invention by cross-sectional view, in FIG. 17 a further type of design of a two-plates-interface valve being closed and in state of rest.

FIG. 1 shows a cross-section through an interface valve according to the invention. Its essential parts are the support 2 for the separating fluid 1c, having generally a large surface in which hole channels 3 are embedded, and the pumping mechanism 4, by which the separating fluid 1c is moved.

The parts of space A and B contain the fluids 1a and 1b which are to be separated. Without the separating fluid 1c the respective hole channel 3 connects the parts of space A and B. The separating fluid 1c is thus pressed into the hole channel by the pumping mechanism 4 so that because of moulding convex or at least local convex interface domains the hole channel 3 is sealed entirely or partially by the separating fluid 1c.

The particular types of design differ from each other mainly by the design of their support 2, the moulding of the edges of the hole channels 3 and by the way by which the separating fluid operates when closing or opening the hole channels 3.

If the closing process is combined with the opening of new holes within the surface of the separating fluid 1c it is referred to as an interface valve having hole sealing.

FIGS. 2a, 2b, 2c, 2d show preferred types of design of the interface valve having a simple design of the support 2 for the separating fluid 1c.

The support 2 comprises a rigid or flexible plate supplied with hole channels 3 which is formed in such a way that it has respectively one accentuated spot with an absolute maximum or an absolute minimum of height which is moulded at that place where a pressure pipeline 4.1 for pressing in the separating fluid 1c by a pumping mechanism 4 joins in.

The separating fluid 1c is chosen in such a way that it develops stable interfaces against the fluid 1a in the part of space A and the fluid 1b in the part of space B. The fluids 1a and 1b may also be identical in this case and in all further types of design of the invention.

The separating fluid 1c belonging to the interface valve's types of design according to the invention of FIG. 2a and FIG. 2b has less specific weight than the fluids 1a and 1 b.

The separating fluid 1c belonging to the types of design according to the invention of FIG. 2c and 2d is heavier than the fluids 1a and 1b.

The edges of the hole channels are moulded in such a way that the interface domains of the separating fluid 1c within the hole channels 3 are convex and that the local curvature does not underpass a certain value k being decisive for the stability of this domain of surface, so that by the appearance of sufficient capillary forces the separating fluid 1c is remaining in a stable position for a certain pressure interval (P0, P1) belonging to the pressure P which is reacted by the pumping mechanism 4 and that it does not pour through the hole channels 3 into the adjacent parts of space A and B.

The pumping mechanism 4 which presses in or exhausts the separating fluid 1c may here—like in all other types of design—be combined with the support 2 either directly or externally by a pressure pipeline 4.1.

As far as necessary the volume corresponding to the separating fluid's volume of displacement is exhausted from or again pressed in both parts of space A or B by the pumping mechanism until the pressure in the vicinity of the separating layer T is approximately in accordance to the state just before. This process is of importance when the container is closed. Technically the pumping mechanism 4 can be realized by a double-chamber piston pump according to FIG. 1. In order to close the interface valve, the pressure P from the pumping mechanism 4 is steadily increased within the admissible pressure interval until the hole channels 3 are sealed by the separating fluid 1c successively. The interface valve is opened by decreasing the pressure P within the same pressure interval (P0, P1). As far as a sufficient large number of hole channels 3 is spread covering the surface of the support 2, the separating layer T can be opened and closed gradually by such an interface valve.

This is valid for all types of design of the interface valve according to the invention.

Beside this all types of design of the support 2 may have only one hole channel 3. Such types of design have a very favourable effect on the opening and closing of pipelines 3 having a very small cross-section of a range less or equal 0,1 mm.

Independently of the support's 2 type of design, the moulding of the hole channels' edges is not restricted to tube's form as depicted in figure, but may be varied in numerous ways; for example it is possible to use wire screens, textile fabrics and similar surface-like, rigid or flexible walls being supplied with holes.

The interface valves according to the invention represented in FIGS. 2a, 2b, 2c, 2d are referred to as position-dependent one-plate-interface valves without hole sealing.

For this type always certain volumes of the separating fluid 1c are to be moved; and therefor these interface valves work relatively inertly.

FIG. 2e depict an interface valve according to the invention referred to as a two-plates-interface-valve without hole sealing. According to this type of design the one-plate-interface-valves described before are arranged in such a way that the volume determined for the separating fluid 1c is separated within a chamber C by two plates 2, having hole channels 3 against the parts of space A and B. In respect to the one-plate-interface-valve the two-plate-interface-valve has the advantage that the separating fluid 1c remains in a stable position within the chamber C to a large extent, despite of the fluctuations of pressure from outside that are conducted by the fluids 1a and 1b. The distance of the two hole plates 2.1a may easily be held constant by proper spacers or by bucklings of the plates 2.1a which serve as spacers.

In order to open or to close the two-plates-interface-valve without hole sealing the separating fluid 1c is to be exhausted from the chamber C or pressed in again entirely. This interface valve may be fitted advantageously to the wished separating plane T separating the parts of space A and B within a wide range.

The FIGS. 3a, 3b, 3c show types of design of the support 2 of the one-plate-interface-valve having hole sealing according to the invention which operates relatively quickly. It suffices to move only small amounts of the separating fluid 1c in order to close the interface valve.

This type of design of the interface valve differs from those types belonging to FIG. 2a to 2e thereby that it is to be fitted and fixed in an approximately horizontal position. Further the edges of the hole channels 3 project nozzle-like from the plate-like support 2 into that part of space C which is destinated for the separating fluid 1c at the support 2. For this type of design of the interface valve a coherent volume of the separating fluid 1c may remain within the part of space C if the interface valve is open. During the closing process the separating fluid 1c swells over the nozzle-like edges the hole channels 3 (FIG. 3b) developing locally convex ring-like interface domains and norrows the respective hole's area of the hole channels as long as the process of the hole sealing of the surface of the separating fluid takes place (FIG. 3c).

While the pressure is increased further by the pumping mechanism 4, the separating fluid 1c penetrates the respective hole channel as long as capillary forces forming curved and stable domains establish a stable posiiton of equilibrium within the admissive pressure interval (P0, P1). If the pumping mechanism 4 decreases the pressure P this process of hole sealing within the surface of the separating fluid 1c is reversed.

The characteristic curve of the pressure comprising the functional relation of the instantanous pressure in the separating fluid 1c and of the respective effective minimal hole's area for not-oscillating outer pressure of the fluids 1a and 1b depicts in regard to the process of opening and closing a hysteresis loop.

Using plate-like supports 2 having hole channels spread proportionately and pattern-like the nozzle-like edges of which are graded by groups, the characteristic pressure curve may be varied within a wide range and may be adjusted to given facts from outside or special needs.

Experiments testing the one- and two-plate interface valves according to the invention show the necessary hole channels' 3 areas depending on the process of operation. Opening and closing the interface valves very slowly it is possible to use still relative large cross-sections of the holes. When in opposition to this quasi-static operation pressure pulses react onto the separating fluid 1c, the cross-sections of the hole channels' areas are to be chosen essentially smaller for this dynamic operation.

What about the combinations of the applied fluids 1a, 1b and the separating fluid 1c, a number of varieties is imaginable.

Since the use of water for the fluids 1a, 1b and air for the separating fluid is of great importance for practical industrial utilization the invention is described in the following by these examples.

Since transferring to other combinations of materials does not afford any considerations and measures lying outside the ability of a specialist having average qualification, it is not further mentioned. It should be noted that the use of water for fluid 1a and 1b and of paraffin oil for the separating fluid 1c represents an essential combination of materials which occurs in practice.

Likewise any specialist having average qualification is able to choose the materials of the hole plates and of all other firm parts fixed to the described interface valve.

The operation of an interface valve having uniform hole channels for fluid (1a)=fluid (1b)=a liquid, fluid (1c)=gas; is dependent according to FIG. 17 a) on the minimal depth of immersion related to the liquid's surface F0 of (1a), b) on the difference of height $\Delta h$ of the existing hole channels related to the liquid's surface F0.

The thickness D of the interface valve as well as the specific gravity of the gaseous separating fluid are neglected within the following considerations. Beside this it is assumed that the length of the hole channels lies within a range of less than 10 mm. In FIG. 17 a two-plate interface valve is depicted in an closed and resting state. There the pressure pa from outside reacting onto the separating medium (1c) exceeds the hydrostatical pressure $(h_0+\Delta h) \delta \cdot g$ which prevails in the depth $(h_0+\Delta h)$ by the amount $\Delta p_a$.

Then the hole channel's cross section $2r$ is calculated approximately by the evaluation $$\Delta pa < \frac{2\sigma}{r} \; [N/m^2]$$

In case of dynamical operation, if pulslike fluctuations of pressure are reacting onto the separating fluid, the rates of r are to be decreased correspondingly. Practical experiments with a two-plate-interface valve which was constructed using plastic plates have led to satisfying results with regard to the system $(1a)=(1b)=$water and $(1c)=$air.

Thereby the hole channel's cross sections were circular, having a diameter $2r=0.5$ mm and a length of 7 mm. The length L according to FIG. 18 was 100 mm, the thickness D 20 mm.

It was operated in an depth of approximately 20 cm below the water surface with a pressure pa from outside reacting onto the separating fluid (1c) which corresponds approximately to the pressure of a water column with a height of 30 cm. The water in question was normal but calcerous mains water. Its temperature was about 15 degrees Celsius.

Further interface valves having hole channels formed as long-drawn slits with a latitude of 0,1 mm, a length of 10 mm and a depth of 7 mm were tested successfully under similar conditions. On the contrary two-plate interface valves whose hole channels had a cross-sectional diameter of 1 mm and more were of no use for the system water$=(1a)=(1b)$ and air$=(1c)$ because the air escaped in the form of small bubbles through the hole channels.

The FIGS. 4a to 4e show a type of design of the interface valve according to the invention.

It is to be manufactured most cost-saving and has been tested already.

This type of design is particularly usable for the purpose of electrophoresis, water being chosen for the fluids (1a), (1b) and air being chosen for the separating fluid (1c). For this example of a type of design according to the invention, the two-plates interface valve is assembled by bolting together two plates of synthetic material 2.1ba, 2.1aa and two pieces of fabric 2.1d.

While operating the interface valve is dipped entirely in water.

The air (1c) used as separating fluid is pressed in according to FIG. 4e, 4b and 4a through a flexible tubing at the nozzle 4.1 and the displaced water is drained off at the other nozzle 4.1.

By this the advantage is gained, that neither during closing nor during opening the interface valve an unwanted rest of the fluid (1a) or (1c) is left in the support since the moved air (1c) occupies a connected hose-like volume having a defined surface within the meander-like guiding channel of the medium spacer plate 2.1ba.

The two pieces of fabric 2.1d serve as hole-gridboards having especially fine holes. As material, for example, cotton fabric may be used.

The plates of synthetic material 2.1aa having hole grids serve just for fixing both pieces of fabric 2.1d.

For this prototpye the distance of the edges of the guiding channel within the medium spacer plate was 5 mm and its depth was likewise 5 mm.

Since the fabrics are wetted by water they are permeable for ions and the width of the pores of the fabric plays a minor part.

Another advantageous type of design of the interface valve according to the invention is depicted by the FIGS. 5a until 5f.

In particular this type works robustly and reliably and is to be employed for very extended and for the most part horizontal separating interfaces, taking water as fluid 1a, 1b and air or paraffin oil as separating fluid 1c.

This type of design of the interface valve has a chamber C comprising a plate-like cavity D while the feeding nozzle and the bleeding nozzle are arranged in different hight. The chamber C is made of solid plates. The ground-and cover-plate of the chamber C are penetrated by tubes or capillaries 3, 3.2, 3.3, 3.2, 3.5 which are projecting into the cavity D in such a way that the equipotential surface of their ends are crossing. If the ends of the tubes or capillaries 3, 3.2, 3.3, 3.4, 3.5 pointing from above to below are projected onto a vertical line and likewise the remaining end of the tubes or capillaries 3, 3.2, 3.3, 3.4, 3.5 pointing from below to above then the projected segments cut themselves on the line.

A very simple type of design which is used for approximately horizontal separating planes is depicted in FIG. 5e being open and in FIG. 5f being closed.

FIG. 5c and 5d show the interface valve from FIG. 5e and 5f in two designs.

According to FIG. 5c the tubes or capillaries have slit-like cross-sections and circular cross-sections according to FIG. 5d. Also other types of cross-sections are possible.

According to the type of design of the interface valve as depicted in FIG. 5a in closed state, the tubes or capillaries 3.2 projecting from above to below into the cavity D have smaller cross sections than the tubes or capillaries 3.3 which point from below to above standing paired in opposite position. The tubes or capillaries 3.2 end in the tubes or capillaries having a bigger cross-section in such a way that the free cross-sectional area of the tubes' or capillaries' 3.3 is filled out only partially.

Another type of design of the interface valve is depicted in FIG. 5b in closed state. It is assumed that the separating fluid 1c is havier than the fluid 1a. The tubes or capillaries 3.4, 3.5 have an U-shaped form and are installed in the cover- or ground-plate of the chamber each oriented oppositely.

For all types of design of FIG. 5 the cross-sections of the holes may be varied within a wide range independently of the formation of the convex domains of surface between the fluid 1a and the separating fluid 1c, as far as the separating plane is horizontal and the interface valve is aligned with it.

If the capillaries 3.2, 3.3, 3.4 are used, the interface valve is independent of the position to a high degree.

It operates in the same way if paraffin oil is used for fluid 1a and 1b and water or air for the separating fluid 1c.

In FIG. 6a to 6e interface valves are depicted which are used to open and to close the capillaries 3d, 3e.

Their simple structure enables use of them in miniature silicon devices for example.

FIG. 9a depicts an interface valve which is controlled indirectly from outside by a tension (U) laid on to a resistor (R), whereupon an electrical current generates electrical heat, closing the capillary by the thermal expansion of the separating fluid 1c. The separating fluid 1c is located together with the resistor (R) within the same chamber C and is connected by a T-shaped piece to the capillary.

According to FIG. 6f and 6g the principle of controlling by the aid of a resistor R allows to construct special interface valves which are independent of position to a high degree, having one or two hole-press-plates 2.1c.

For this type separated chambers C1 containing the separating fluid 1c and the respective resistance R are planned according to the number of hole channels 3 within the plate 2.1 which are fixed firmly attached and in opposite position to the conically convergent hole channels.

If this interface valve is in an aqueous medium 1a it is possible to measure the local conductivity of the resprective fluid 1a by sensors F1, F2, . . . , FN and E1, E2, . . . , EN which is dependent on the grade of opening of the concerning hole channel.

Let each rate of conductivity be transformed proportionally in particular tensions U1, . . . , UN, then it is possible to lead them to N amplifiers for tension-current-amplification. Then a collectively controllably system of N such amplifiers (FIG. 6g) is able to produce the corresponding currents I1, . . . , IN, for the N resistors R within the chambers C1, the electric heat of which controls the particular pressure of the separating fluid in the chambers C1 indirectly.

FIG. 6b depicts another type of design of the interface valve, having the chamber containing the resistor R separated from the chamber C containing the separating fluid 1c by a somewhat longer pipeline 4.1.

By this construction the impairment of the surface tension due to the generation of messure by electrical heat is excluded. In case an interface valve according to FIG. 6c the pressure affecting the separating fluid 1c is generated outside the chamber C by a special pressure generator 4 and is transferred through a buffer medium 1d which builds up a defined separating plane towards the separating fluid 1c and through a pipeline 4.1.

FIG. 6d depicts one type of design of the interface valve which serves for simultaneous controlling of a bundle of capillaries 3e being in open state; in FIG. 6e the same interface valve is shown in closed state.

In the case of the two-plates interface valve the edges of the hole channel 3 of both the perforated plates may be formed and be connected with one-another in such a way that they serve as spacers at the same time while lateral openings in the inner wall of the perforated plate are to be spared out for pressing in the separating fluid 1c.

According to the number and arrangement of such lateral openings for the separating fluid is has to be distinguished between hole channels 3 destined for the function of pressing-on the separating fluid 1c and those destined for hole sealing within the surface of the separating fluid 1c.

The geometry of the hole channel 3 destined for the function of pressing-on the fluid 1c is defined thereby that a connected part of the wall within the hole channel 3 serving in particular as a contact surface or a pressing-on surface for the separating fluid 1c is in opposite position to the concerning lateral opening.

On the other-hand the geometry of the hole channel 3 destined for hole sealing within the surface of the separating fluid is thereby defined that the concerning lateral opening within the hole channel is in opposite to another such an opening.

Figure 5A:
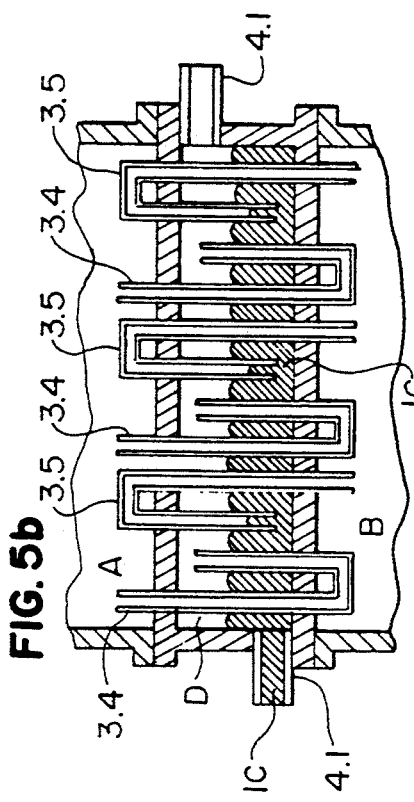
Figure 5C:
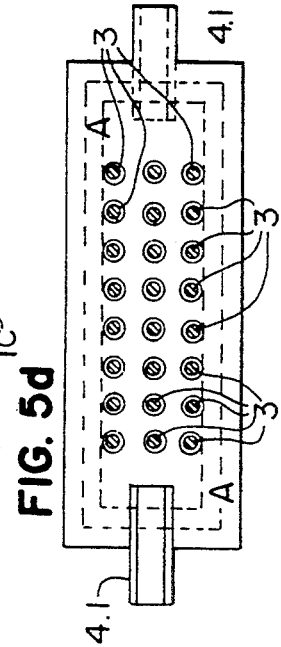
Figure 5E:
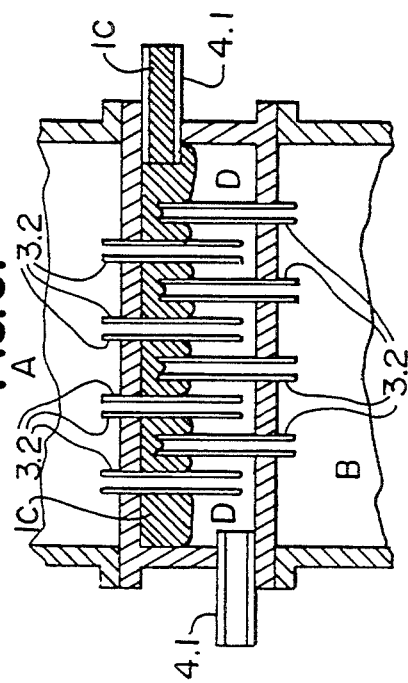
Figure 5B:
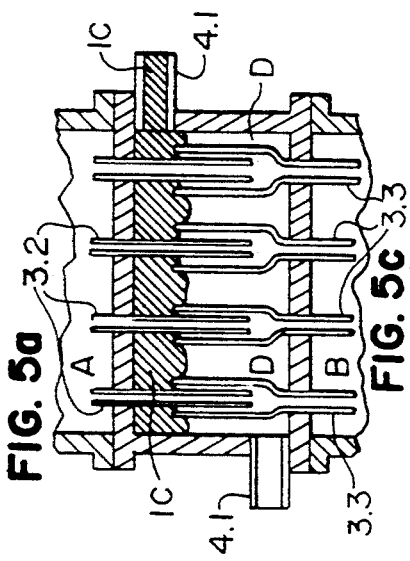
Figure 5D:
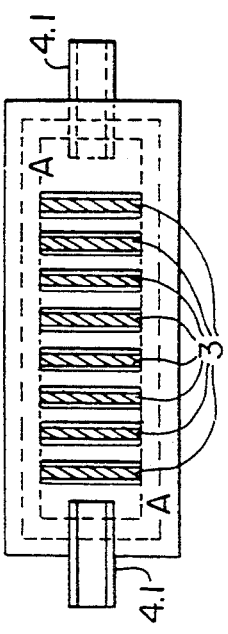
Figure 5F:
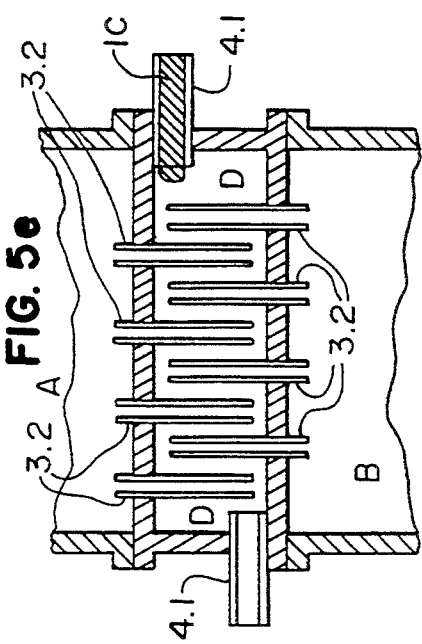
Figure 7A:
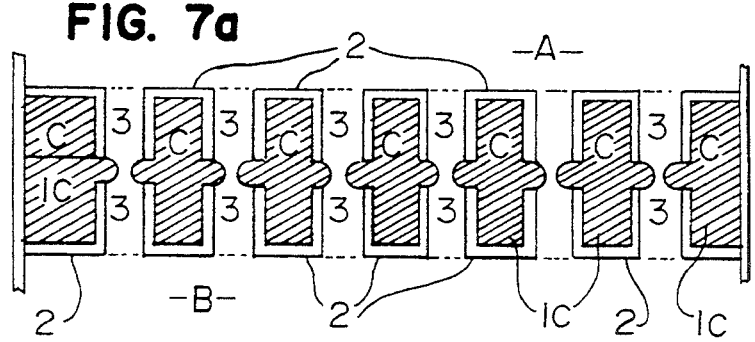
FIG. 7a depicts a two-plates interface valve with hole sealing which is to be built in an approximately horizontal position but which on the other hand profits from the advantage that only a minimal part of the separating fluid 1c has to be moved.
Figure 7B:
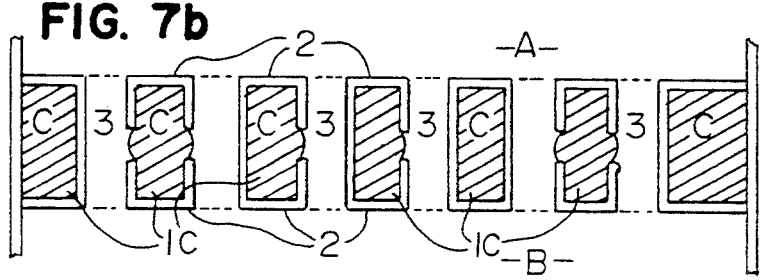
Figure 7C:
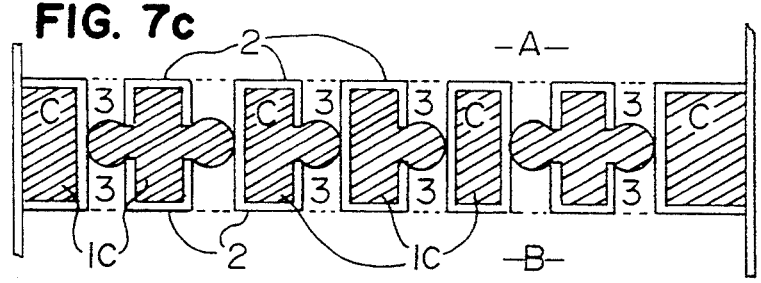
Figure 7D:
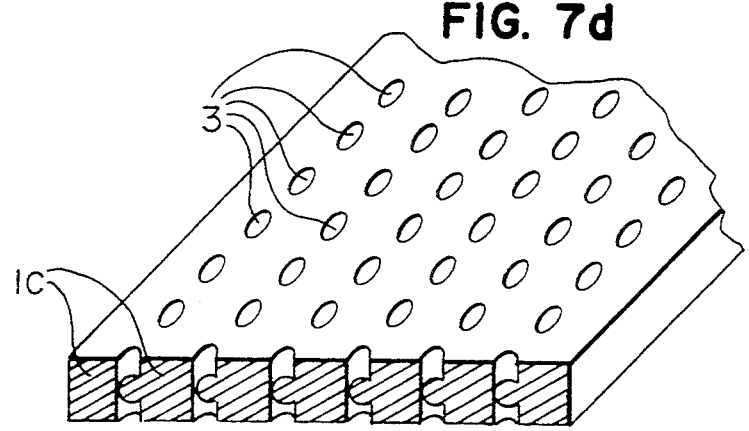
Figure 8A:
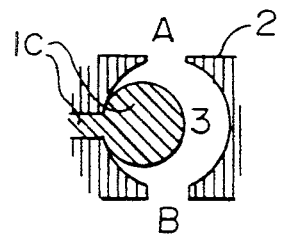
Figure 8B:
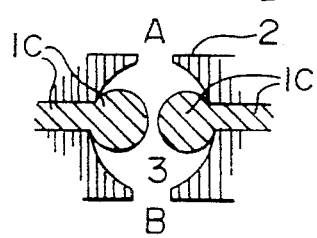

For either type the hole channels may be moulded in the vicinity of the lateral openings according to FIG. 8a and 8b in container-like or locally convex form as to hold the interface of the separating fluid as steady as possible.

Figure 8C:
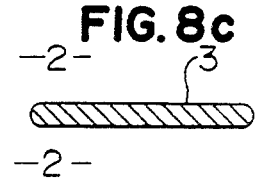
Figure 8D:
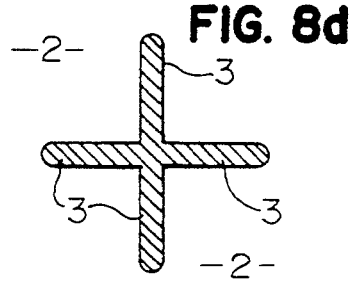
Figure 8E:
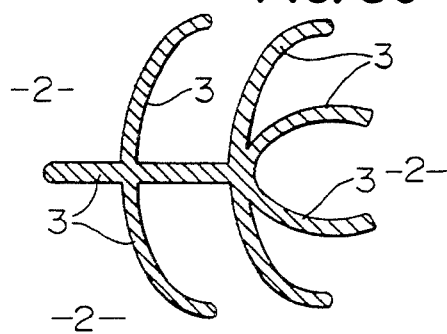

In addition to this it is possible to form the cross section of the hole channels 3 mounted in opposition to the parts of space A and B slit-like according to FIG. 8c, star-like according to FIG. 8d or branched according to FIG. 8e.

Figure 8F:
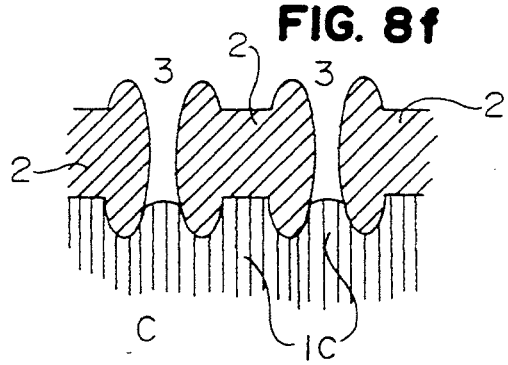

If a current is to flow through the interface valve in open state it is possible to mould the inner wall and the ends of the channel holes streamlined according to FIG. 8f.

Figure 9A:
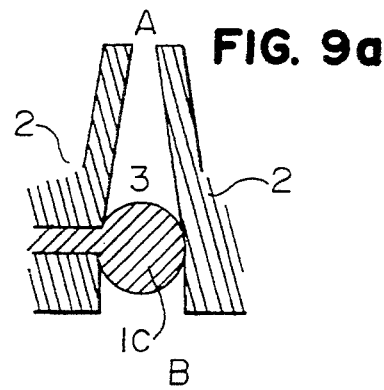
Figure 9B:
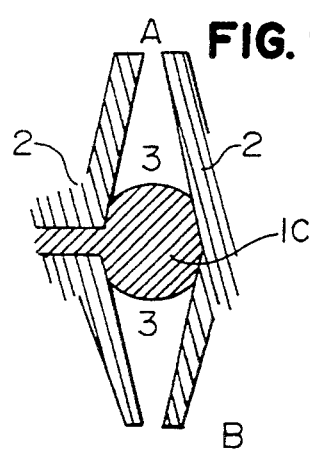
Figure 10A:
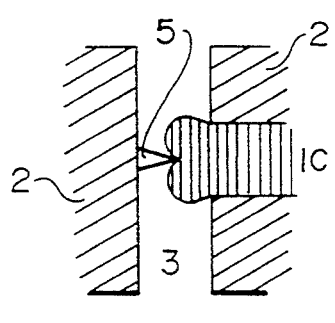
Figure 10B:
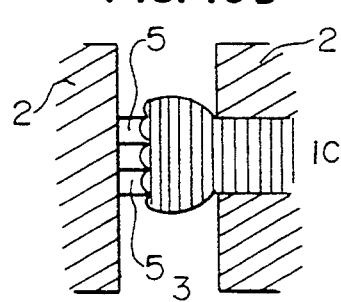
Figure 10C:
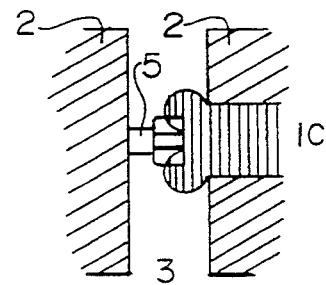
Figure 11A:
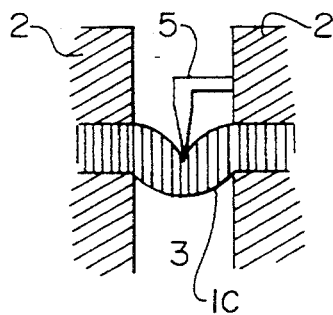
Figure 11B:
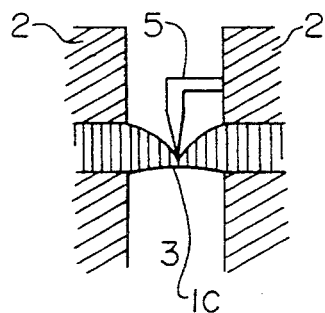
Figure 11C:
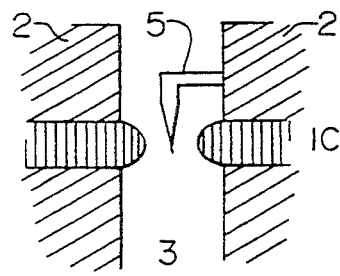

For the same purpose it is also possible to supply the edges of the hole channels 3 which are adjacent to the parts of space A and B with nozzle-like prolongations which converge conically at least relative to an intersection plane perpendicular to the separating plane T (FIG. 9a, 9b).

In order to create further interface domains of the separating fluid 1c having a higher curvature, it is possible to mount pressure props 5 within the hole channels 3 or at the holes' areas bordering on the parts of space A and B to the support 2 according to FIG. 10a, 10b, 10c, 11a, 11b, 11c.

In particurlar such pressure props of various forms may be used to control the process of hole sealing of the surface of the separating fluid 1c.

After all the statements concerning the variability of the shape of the hole channels and of the pressure props are not restricted to the two-plate-interface valve alone but are also valid for all other types.

The types of design of the support 2, the cross sections of which are represented in FIG. 12 and FIG. 13 refer to interface valves having hole-press-plates.

Like the one plate- and two plates- interface valves just described these may be laid out in a simple way having extended area and for example may be manufactured by plastic foils according to the procedure of deep drawing.

To a high degree they are independent of position and work relatively quickly since only minor amounts of the separating fluid 1c are necessary for narrowing or sealing the holes of the respective hole-press-plate.

Both types are to be combined with the support of the interface valves described before.

Their form may also be varied within a wide range without impairing their function.

The support 2 according to FIG. 12 comprises the hole-press-plate 2.1c having periodically arranged holes 3c and a system of chambers C for the separating fluid 1c, which is arranged in opposite position and is fixed by a spacer 6, while the chambers C are connected mutually through one ore several pressure tubings 4.1 to the pumping mechanism 4.

This system of chambers C is perforated by hole channels 3ab in such a way that both the parts of space A and B are to be connected through the holes 3c of the hole-press-plate 2.1c.

Each of the chambers C is provided with the connecting pipelines linking them mutually and with the pumping mechanism 4 and with one or several bubble-pouring-openings 3b being arranged in opposite position to the holes 3c of the hole-press-plate 2.1c and being adapted to these concerning the form of the areas of the holes and the edges of the holes in such a way that the fluid 1c is to be pressed out of the bubble-pouring-openings 3b and again is to be exhausted within the admissible pressure interval (P0, P1) in such a way that the holes 3c of the hole-press-plate 2.1c are narrowed, sealed and opened again.

The Chambers C for the separating fluid 1c and the connecting pipelines linking them and the pumping mechanism 4 may be manufactured by glueing or welding two previously suitable formed hole plates for example.

In summary the whole support 2 may be manufactured by glueing or welding the upper hole-press-plate 2.1c, the bubble-pouring-plate 2.1b in the mid position and the hole-chamber-groundplate 2.1a by the aid of the spacers 6 or by appropriate bucklings of the three plates which serve as spacers.

Moreover their stability is augmented in this manner that all three plates are connected with each other at the lateral edge.

The type of design of the support 2 depicted in FIG. 13a is a combination of both the supports which FIG. 12 shows.

It is produced by combining the supports of FIG. 12 with each other in such a way, that the chambers C containging the separating fluid 1c and the openings 3ab of the hole channels adjoin each other.

Both the groundplates 2.1a of the hole-chamber are not essential parts of this combined interface valve and may be omitted provided only that both the bubble-pouring-plates 2.1b are fixed to each other in this manner that the hole channels 3bb and the joint chambers C of the separating fluid 1c together with their supply lines are preserved and are coupled by the pressure pipelines 4.1 to the pumping mechanism 4.

The form of the type of design of the support 2 depicted in FIG. 12 and FIG. 13a may be varied within wide limits without harming its function.

It is also possible to combine the supports 2 depicted in FIG. 12 and FIG. 13 with each other and with those ones described just before.

Figure 13B:
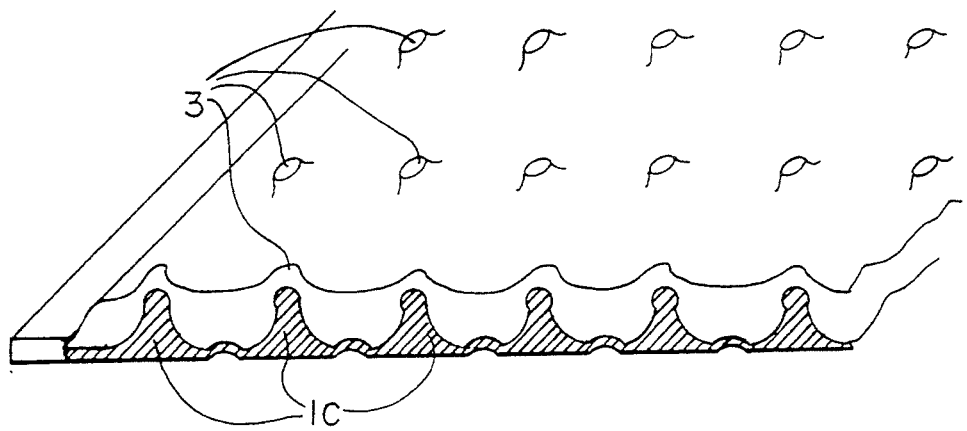
Figure 13C:
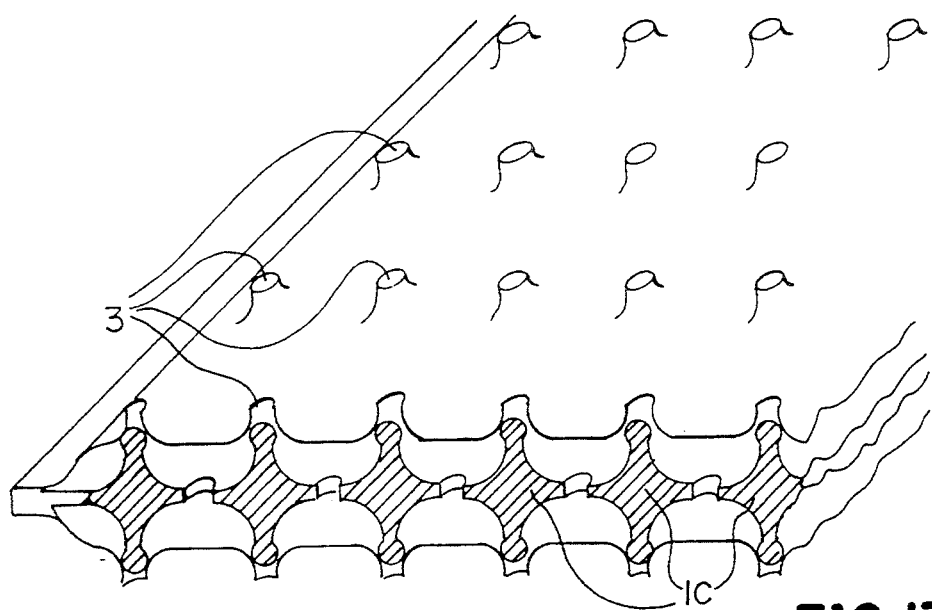
Figure 13D:
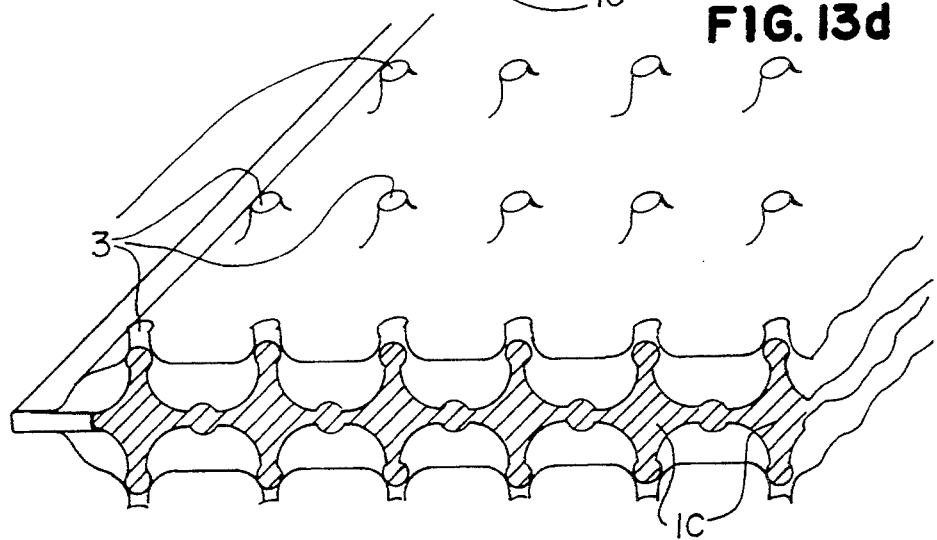

With regard to it compare the FIGS. 13b, 13c, 13d.

All described types of design of the interface valve as well as their combinations are qualified in a unique way for the aims of chemical engineering and electrochemistry.

Figure 14:
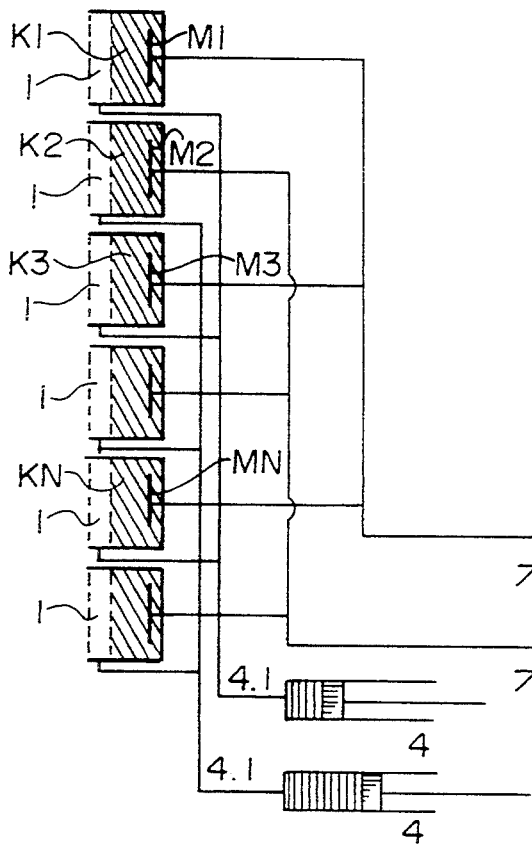

FIG. 14 depicts the structure of a multi-material-electrode-system schematically.

For example by the aid of such an electrode system it is possible to generate metallic multilayers and heterostructures having sequences of layers within the range of some tenthousands and more by electroplating without being obliged to change the electrolyte solution.

On behalf of this very circumstance entirely new aspects for the material science are emerging.

The multi-material-electrode-system comprises $N = 1, 2, 3, \ldots$ chambers K1, K2, K3, ... being arranged in a mosaic-like and planar form, which are opened or closed by just as many interface valves 1 controllably.

The chambers K1, K2, K3 contain electrodes of different materials M1, M2, M3, M4, ... MK which can be connected with appropriate power sources by the aid of isolated cables.

The main field for the applications of the interface valve according to the invention might be the separation of material and in particular the separation of ionic mixtures by utilizing different ion migration velocities in aqueous and non-aqueous electrolytes having appropriatly oriented electric fields.

A simple example of such an ion separation plant is displayed in the FIGS. 15a, 15b, 15c, 15d schematically.

It comprises a tube-like container for the electrodes and the electrolyte which is equipped with interface valves 1 in such a way that the ionic mixture which is to separated is enclosed for the moment in the part of space AO.

Let a voltage U be applied to the electrodes E1 and E2 and let the interface valves 1, enclosing volume AO be opened. Then an electrical field is established within the tube-like container and the ionic cloud in AO begins to move towards the electrodes E1 and E2 according to its anionic- and cationic portions.

If for example a certain cationic portion is
to be separated out of Q different other cationic portions, it is necessary to compare the different ion migration velocities within the said electrolyte in relation to the applied voltage.

If the ions move along a sufficient long way a certain favoured enrichment of the cationic portions in question can be determined despite statistical incidents like for example the diffusion processes within the different segments A1, A2, A3, ....

If the said segments are enclosed by pairs of interface valves 1 like the volume AO, a first coarse separation of this ionic mixture can be achieved. Additional tube-like containers, which are subdivided by interface valves 1 and have electrodes are fixed laterally to the segments A1, A2, A3, ... of the tube-like container in order to separate a certain ionic portion even finer or to achieve an even stronger enrichment thereof.

By opening the concerning interface valves and applying appropriate tensions the separation process can be repeated perpendicularly to the first direction of movement of the ions.

On principle it is possible to construct and operate separation plants of arbitrary size and of a dendritic structure.

In case it may be of advantage to let the ionic mixture, which is to be separated, move in a circularly closed loop by locally bounded electrical fields that move successively along the desired direction.

Moreover it may be reasonable to protect the electrodes that have to generate the electric fields from eventual chemical reactions caused by the arriving ionic cloud within the electrolyte.

Figure 15A:
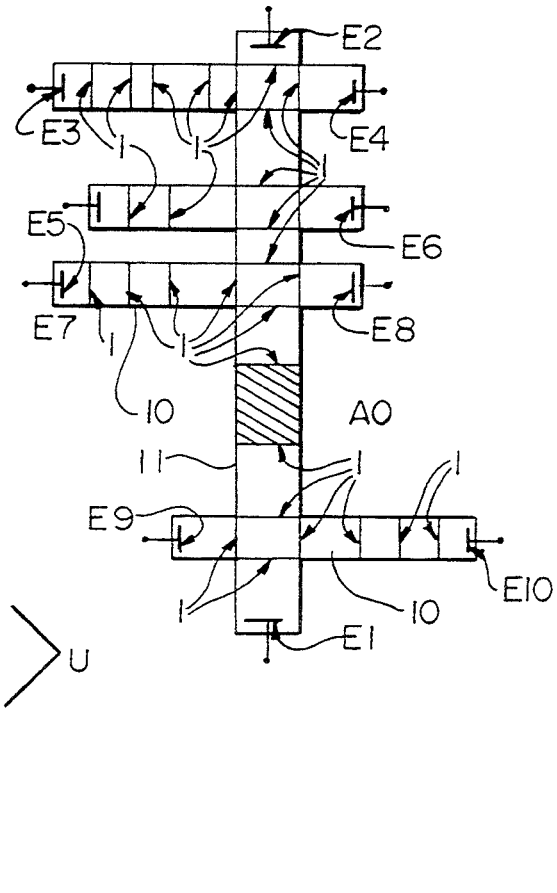
Figure 15B:
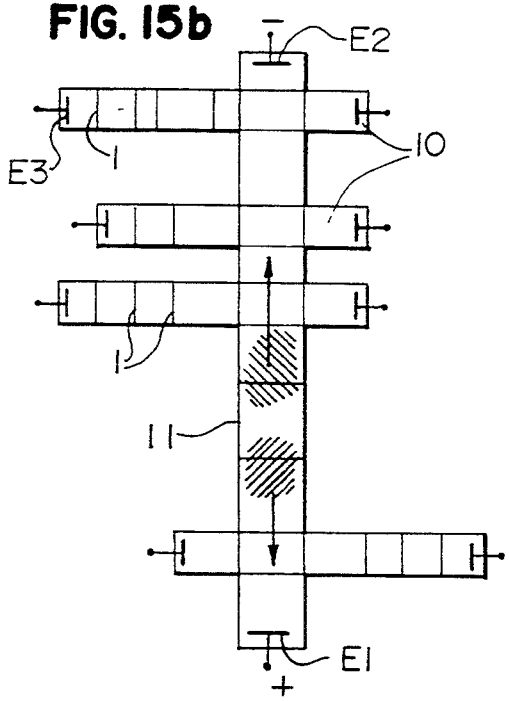
Figure 15C:
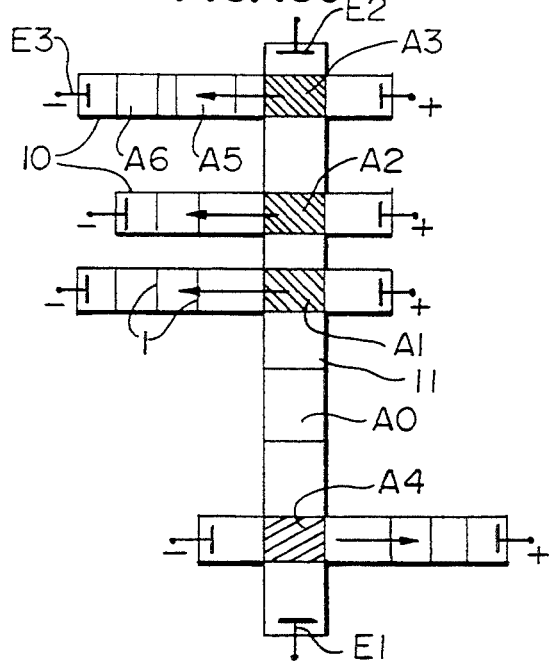
Figure 15D:
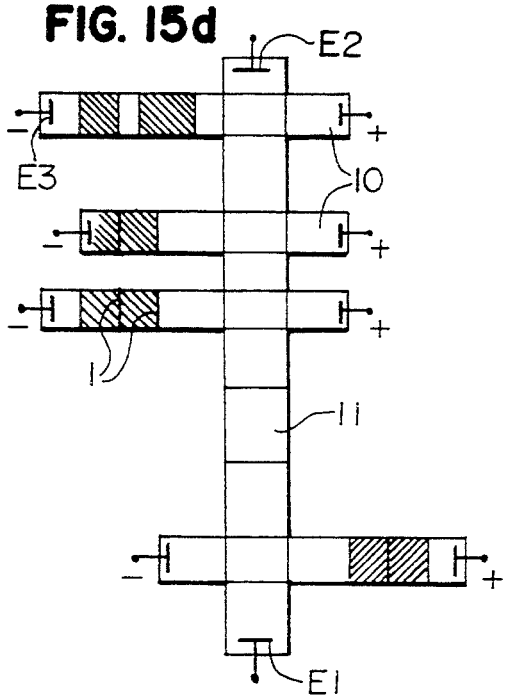
Figure 15E:
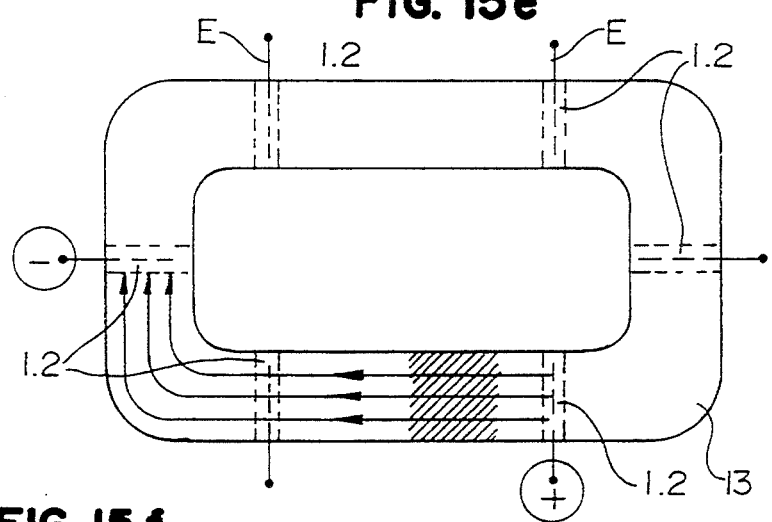
Figure 15F:
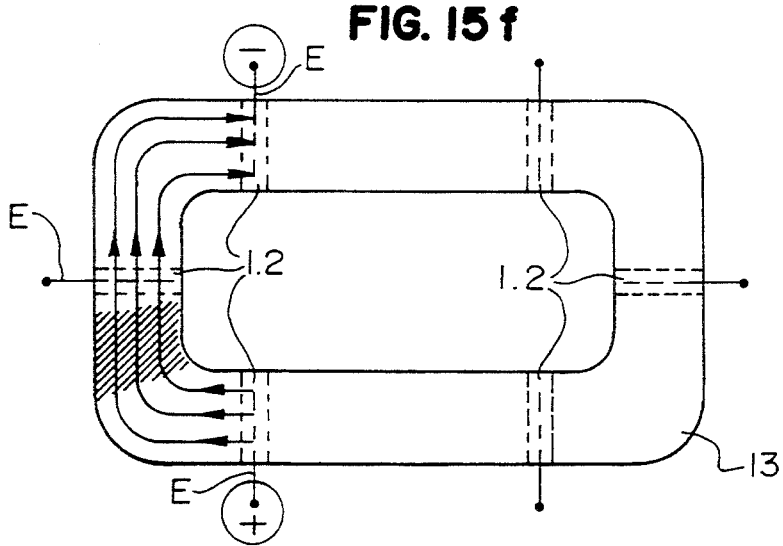

Both these aspects are very important, if the ions have to move along a distance, which exceeds the length of the tube-like container. If such a container has a circular form and if an electrical field can be moved with a proper velocity along the container (FIG. 15e, 15f, 15g) the distance necessary for the separation process can be prolonged at will at least theoretically.

In order to prevent the interfering and penetrating of the cationic and anionic portions because of their moving in opposed directions, additional passing loops W that are coupled by interface valves an be added to the ring-like container as depicted by FIG. 15h.

Figure 16:
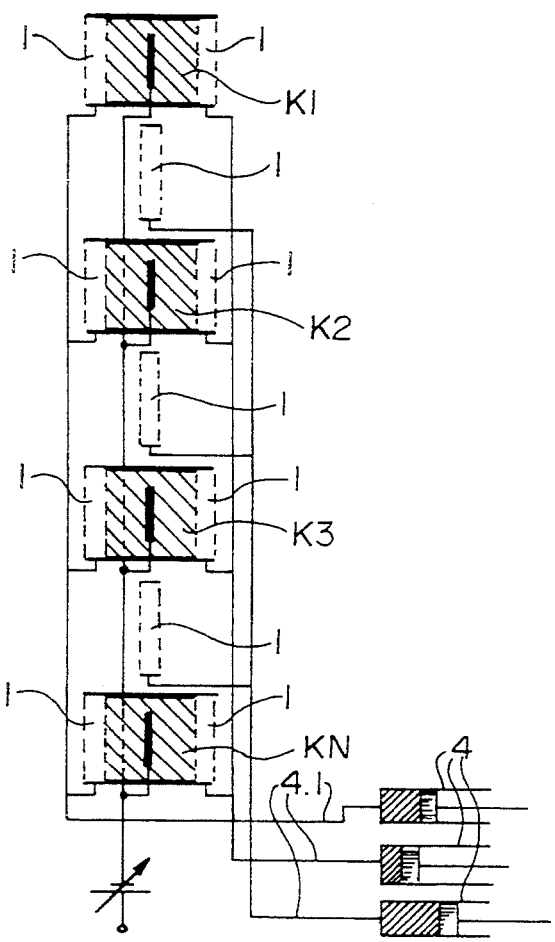
Figure 17:
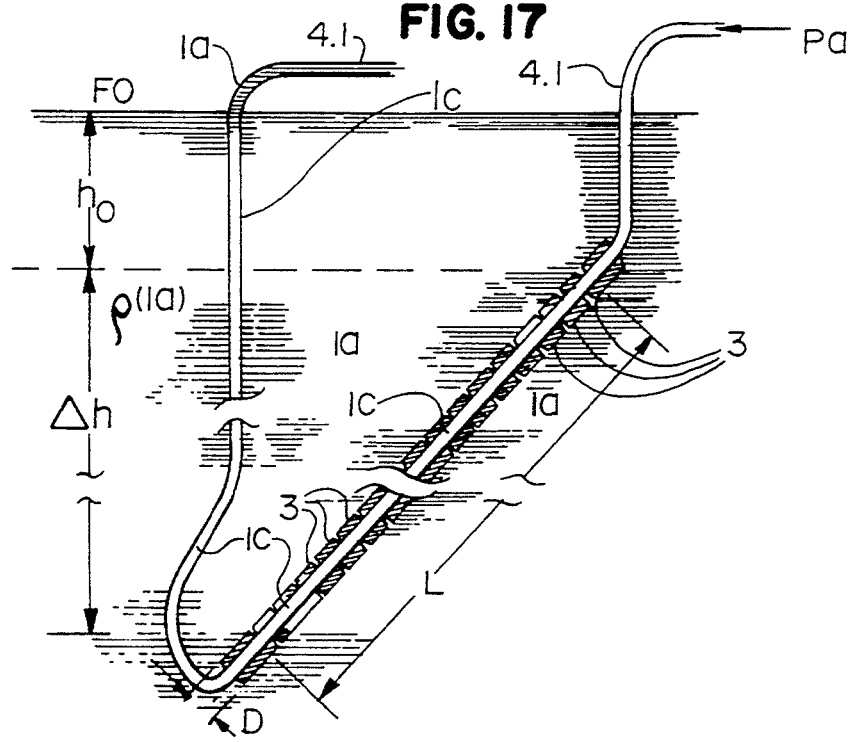

The interface valve system being presented schematically in FIG. 16 is specially appropriate for all these separation plants.

It differs form the interface valve system according to FIG. 14 in this respect that the chambers K1, K2, K3, ... containing the electrodes can be closed and opened under control on both sides towards the parts of space A and B by interface valves 1.

Moreover besides these chambers K1, K2, K3, . . . L=1, 2, 3, . . . additional and separately controllable interface valves 1 are mounted within the effective surface.

Such interface valve systems are to be produced for a minimum of costs too and are practically without wear.

What is claimed is:

1. A method for the separation of fluids comprising the steps of:
    inserting a separating fluid (1c) into an existing body of fluid to form a separating layer (T) between a first quantity (1a) of said body of fluid and a second quantity (1b) of said body of fluid so that said separating layer (T) causes separation of said first and second quantities by interface tension therebetween;
    said separating fluid (1c) being inserted by transferring said separating fluid (1c) with a pumping mechanism to a support (2) which is positioned at a location where said separating layer (T) is formed, said support including at least one channel hole (3) between said first and second quantities of said body of fluid;
    said separating fluid (1c) being transferred to said support (2) so that said separating fluid at least partially enters and seals or narrows said at least one channel hole (3), thereby preventing said first and second quantities of said body fluid from penetrating said at least one channel hole.

2. The method of claim 1 comprising the further step of, after said first and second quantities of fluids have been separated, withdrawing said separating fluid (1c) from said support (2) so that said first and second quantities of said body of fluid are unified.

3. The method of claim 2 in which said support (2) divides a first designated space (A) from a second designated space (B) and comprises the further steps of, while withdrawing said separating fluid (1c) from said separating layer (T) simultaneously withdrawing a portion of said first and second quantities of fluid, respectively, from said first and second designated spaces.

4. The method of claim 1 wherein said separating layer (t) is formed so that said first quantity of fluid (1a) is confined to a first designated space (A) and said second quantity of fluid (1b) is confined to a second designated space (B).

5. The method of claim 4 comprising a further step of, after said separating layer (T) is formed and a time period has elapsed, withdrawing said separating fluid (1c) from said separating layer (T) by use of said pumping mechanism (4) to open said at least one channel hole which have been sealed or narrowed by said separating fluid so that said first and second quantities of fluid are allowed to reunite.

6. The method of claim 1 in which said support (2) divides a first designated space (A) from a second designated space (B) and said method comprised the further step of, while inserting said separating fluid (1c) between said first and second quantities of fluid, simultaneously introducing a portion of said first and second quantities of fluid, respectively, into said first and second designated spaces.

* * * * *